(12) United States Patent
Chen et al.

(10) Patent No.: US 10,929,330 B2
(45) Date of Patent: Feb. 23, 2021

(54) EXTERNAL RESOURCE DISCOVERY AND COORDINATION IN A DATA CENTER

(71) Applicant: INTEL CORPORATION, Santa Clara, CA (US)

(72) Inventors: Chih-Cheh Chen, Portland, OR (US); Russell J. Wunderlich, Livermore, CO (US); Tina C. Zhong, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 724 days.

(21) Appl. No.: 15/639,035

(22) Filed: Jun. 30, 2017

(65) Prior Publication Data

US 2019/0004989 A1 Jan. 3, 2019

(51) Int. Cl.
*G06F 13/40* (2006.01)

(52) U.S. Cl.
CPC .......... *G06F 13/4081* (2013.01); *G06F 13/40* (2013.01); *G06F 13/4004* (2013.01)

(58) Field of Classification Search
CPC ... G06F 13/4004; G06F 13/4081; G06F 13/40
See application file for complete search history.

(56) References Cited

U.S. PATENT DOCUMENTS

| | | | |
|---|---|---|---|
| 6,446,154 B1 * | 9/2002 | Ajanovic | G06F 13/4273 370/420 |
| 2012/0200585 A1 * | 8/2012 | Offen | G06F 13/4282 345/557 |
| 2013/0031568 A1 * | 1/2013 | Tamir | G06F 9/546 719/318 |

* cited by examiner

*Primary Examiner* — Glenn A. Auve
(74) *Attorney, Agent, or Firm* — Kacvinsky Daisak Bluni PLLC (57) ABSTRACT

Examples may include chipsets, processor circuits, and a system including chipsets and processor circuits. The chipsets and processor circuits can be coupled together via side band interconnect. The chipsets and processor circuits can be coupled together dynamically, during runtime using the side band interconnects. A chipset can send control signals for other chipsets and/or receive control signals from processor circuits via the side band links to dynamically coordinate the chipsets and processor circuits into systems.

25 Claims, 8 Drawing Sheets

EXTERNAL RESOURCE DISCOVERY AND COORDINATION IN A DATA CENTER

TECHNICAL FIELD

Embodiments described herein generally relate to data centers and particularly to resource discovery and coordination within a data center.

BACKGROUND

Advancements in networking have enabled the rise in pools of physical resources. A pool of physical resources may be formed from a physical infrastructure including disaggregate physical resources, such as, for example, compute and storage resources found in large data centers. The physical infrastructure can include several computing systems having processors, memory, storage, networking, power, cooling, etc. Management entities of these data centers can aggregate a selection of the physical resources to form servers and/or physical computing hosts. These hosts can subsequently be allocated to execute system software (e.g., operating systems (OSs), virtual machine managers (VMMs), or the like) and host containers, virtual machines (VMs), and/or applications.

DETAILED DESCRIPTION

Data centers may generally be composed of many racks that can contain numerous types of hardware or configurable resources (e.g., processing units, memory, storage, accelerators, networking, fans/cooling modules, power units, etc.). The types of hardware or configurable resources deployed in data centers may also be referred to as physical resources or disaggregate elements. It is to be appreciated, that the size and number of physical resources within a data center can be large, for example, on the order of hundreds of thousands of physical resources. Furthermore, these physical resources can be pooled to form virtual computing platforms for a large number and variety of computing tasks.

The variety of physical resources that can be deployed in a data center can greatly complicate the chipsets for these many resources. For example, chipsets are required for the various resources in a data center to form and/or partition these resources into compute nodes. A platform comprising processors typically includes chipsets coupled to the processors. The chipsets provide control and interface functionality (e.g., memory management, data path provisioning, exposing interfaces, or the like) for the processors and can facilitate partitioning of the platform. However, where multiple platforms are deployed in a data center, the platform specific chipsets are unable to properly facilitate partitioning. Conventional solutions provide custom control logic to couple the platforms and specifically to couple the chipsets from each platform. However, this increases costs for data center deployments, can reduce an ability to scale data centers over time and reduces the efficiency of debug operations for the data center.

The present disclosure provides an interface arranged to couple chipsets to processors and chipsets to chipsets. In general, the interface is agnostic to the type of connection (e.g., chipset to processor or chipset to chipset) and can be utilized to discover the status of link partners and add or remove additional link partners without restarting the system. In some embodiments, a chipset comprising a side band interface is provided. The chipset can couple to processors and/or other chipsets via the side band interface. Furthermore, the chipset can include pins or "straps" where control signals can be applied to couple the chipset with processors and/or other chipsets to coordinate connections in a system as described herein.

Figure 1:
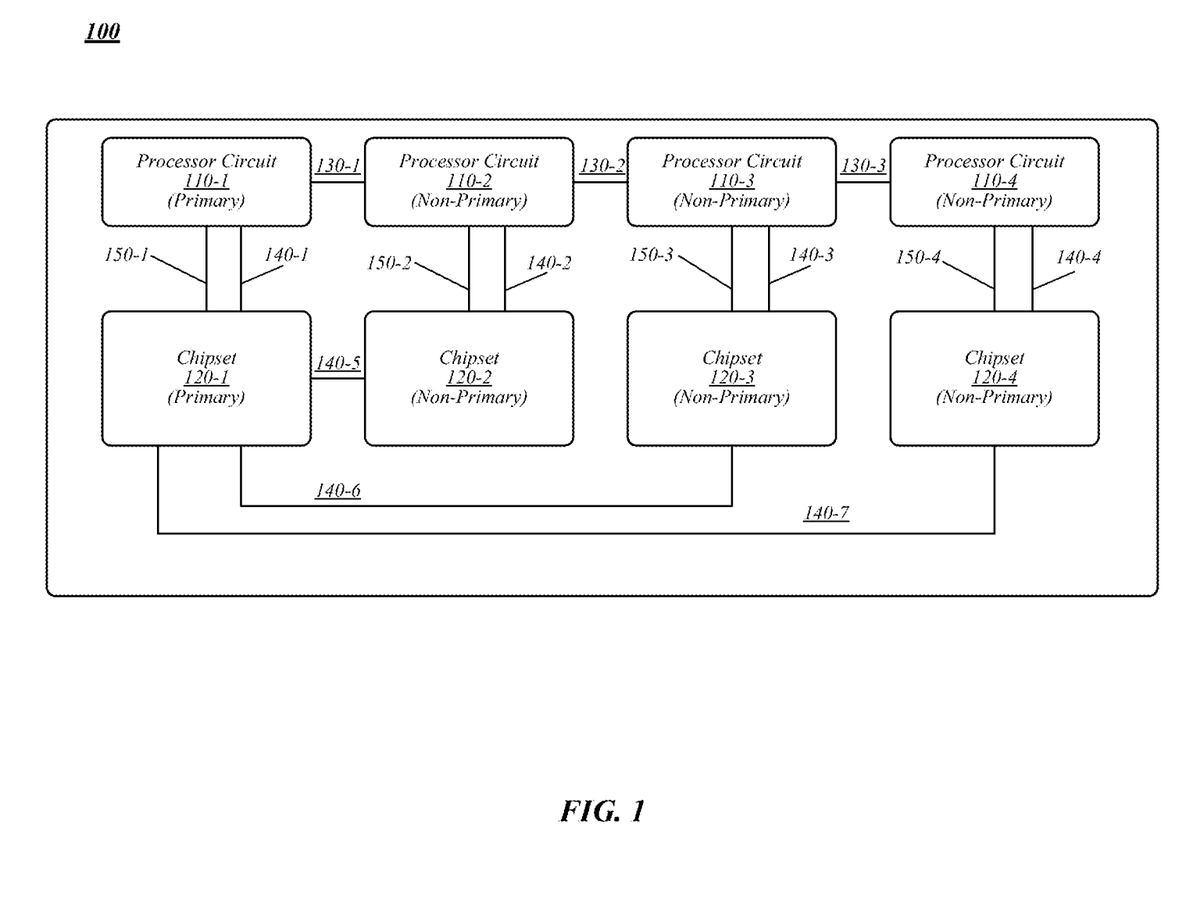
FIG. 1 illustrates a first embodiment of a system.

FIG. 1 illustrates an example system 100, implemented in accordance with some embodiments of the present disclosure. The example system 100 depicted in this figure comprises processor circuit 110-1, processor circuit 110-2, processor circuit 110-3, and processor circuit 110-4. Additionally, system 100 includes chipset 120-1, chipset 120-2, chipset 120-3, and chipset 120-4. It is noted that system 100 could include any number of processor circuits 110 and chipsets 120. For example, system 100 could include 2, 4, 8, 16, etc. processor circuits 110 and 2, 4, 8, 16, etc. chipsets 120. Furthermore, system 100 need not include the same number of processor circuits 110 as chipsets 120. For example, a single chipset 120 could be arranged to couple to multiple processor circuits 110 (e.g., as in FIG. 3-4). Furthermore, system 100 could include other components, such as, for example, memory, network interfaces, radios, a power source and/or battery, display components, graphics processing circuitry, peripheral components, or the like. It is noted, that in some embodiments, system 100 may be implemented with a limited number of elements. For example, with some embodiments, system 100 can be implemented with at least one processor 110 and one chipset 120 and a total of eight (8) processors 110 and/or chipsets 120.

In general, processor circuits 110-1 to 110-4 can be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuits 110-1 to 110-4 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuits 110-1 to 110-4 may be implemented as a general-purpose processor. The embodiments are not limited in this context.

In general, chipsets 120-1 to 120-4 can comprise hardware logic and circuitry arranged to manage data flow between respective processor circuits 110-1 to 110-4 and memory and/or peripherals coupled to the system 100. For example, chipset 120-1 to 120-4 could be a northbridge chipset, a southbridge chipsets, a platform control hub (PCH), a Fusion Control Hub (FCH), a custom designed chipset, or the like. It is noted, that an exhaustive list of all possible chipsets is not practical to list here. However, as used herein, "chipset" is intended to mean a hardware circuit arranged to couple a processor circuit to memory, peripherals, or interfaces.

Each of processor circuits 110-1 to 110-4 can be coupled to one or more other ones of processor circuits 110-1 to 110-4 via a point-to-point (P2P) interconnect 130. For example, processor circuit 110-1 is depicted coupled to processor circuit 110-2 via P2P interconnect 130-1 while processor circuit 110-2 is also depicted coupled to processor circuit 110-3 via P2P interconnect 130-2. Additionally, processor circuit 110-3 is depicted coupled to processor circuit 110-4 via P2P interconnect 130-3. In general, P2P interconnects 130 can be any of a variety of interconnects arranged to couple processor components to each other. For example, P2P interconnects 130 can be a front-side bus, a Hyper Transport link, a QuickPath Interconnect, an UltraPath Interconnect, or the like. With some examples, the P2P interconnects 130 can couple processor circuits 110-1 to 110-4 to other components, such as, for example, cache, unicore components, or the like.

Each of chipsets 120-1 to 120-4 can be coupled to a respective processor circuit 110-1 to 110-4 via both a P2P interconnect 150 as well as a side band interconnect (SBI) 140. For example, chipset 120-1 is depicted coupled to processor circuit 110-1 via P2P interconnect 150-1 and SBI 140-1; chipset 120-2 is depicted coupled to processor circuit 110-2 via P2P interconnect 150-2 and SBI 140-2; chipset 120-3 is depicted coupled to processor circuit 110-3 via P2P interconnect 150-3 and SBI 140-3; and chipset 120-4 is depicted coupled to processor circuit 110-4 via P2P interconnect 150-4 and SBI 140-4. Additionally, a one of chipsets 120-1 to 120-4 can be coupled to other ones of the chipsets 120-1 to 120-4 via SBIs 140. For example, chipset 120-1 is depicted coupled to chipsets 120-2 to 120-4 via SBIs 140-5 to 140-7, respectively. In general, P2P interconnects 150 can be any of a variety of interconnects arranged to couple processor components to each other. For example, P2P interconnects 150 can be a front-side bus, a Hyper Transport link, a QuickPath Interconnect, an UltraPath Interconnect, or the like.

During operation, one of the processor circuits 110-1 to 110-4 and one of the chipsets 120-1 to 120-4 identify as a "primary" processor circuit 110 and a "primary" chipset 120 while the other processor circuits and chipsets identify as "non-primary" processor circuits and "non-primary" chipsets 120.

The primary chipset 120-1 can be arranged to couple to other non-primary chipsets 120 via SBIs 140. Additionally, each of chipsets 120 can be arranged to couple to one or more processor circuits 110 via SBIs 140. Thus, system 100 can be implemented to provide an increase in coordination, due to the SBI 140 connections between elements within system 100 (or in a larger data center in which system 100 might be deployed). For example, in some embodiments, system 100 can be arranged to add a non-primary chipset 120 or processor circuit to system 100 while system 100 is in operation. It is noted, that this is not possible using conventional techniques to couple chipsets within processor circuits. Adding a chipset to a system, such as, system 100, conventionally, requires a system wide reset (or reboot). Furthermore, this increases the flexibility with which processor circuits in a data center can be aggregated into virtual systems. For example, a processor can be added to a system, such as, the system 100 without rebooting the system. Thus, increasing the efficiency and capacity of the system.

In general, chipsets 120 are arranged to receive a control signal to include an indication of whether the chipset is a primary chipset or a non-primary chipset. Additionally, chipsets 120 are arranged to receive a control signal to include an indication of whether the chipset 120 is in a multi-chipset system (e.g., system 100, or the like). For example, in some implementations, chipsets 120 can include pin straps arranged to receive control signals including indications of whether the chipset 120 is a primary or non-primary chipset as well as whether the chipset is in a multi-chipset system.

Furthermore, chipsets 120 can be arranged to determine whether a SBI 140 is active or inactive. For example, chipset 120 can be arranged to determine whether a SBI 140 is coupled to another chipset 120 or processing circuit 110 which is active within system 100. As another example, chipset 120 can be arranged to determine whether one or multiple SBIs 140 is active. For example, all but one chipset 120 is a non-primary chipset. In some embodiments, a non-primary chipset can only be connected to a primary chipset 120 and processor circuit(s) 110 via SBIs 140. As such, any SBIs 140 which couple the non-primary chipset 120 to another non-primary chipset 120, can be designated as inactive or dormant (see FIG. 2). This is described in greater detail below, for example, when discussing FIG. 5.

Figure 2:
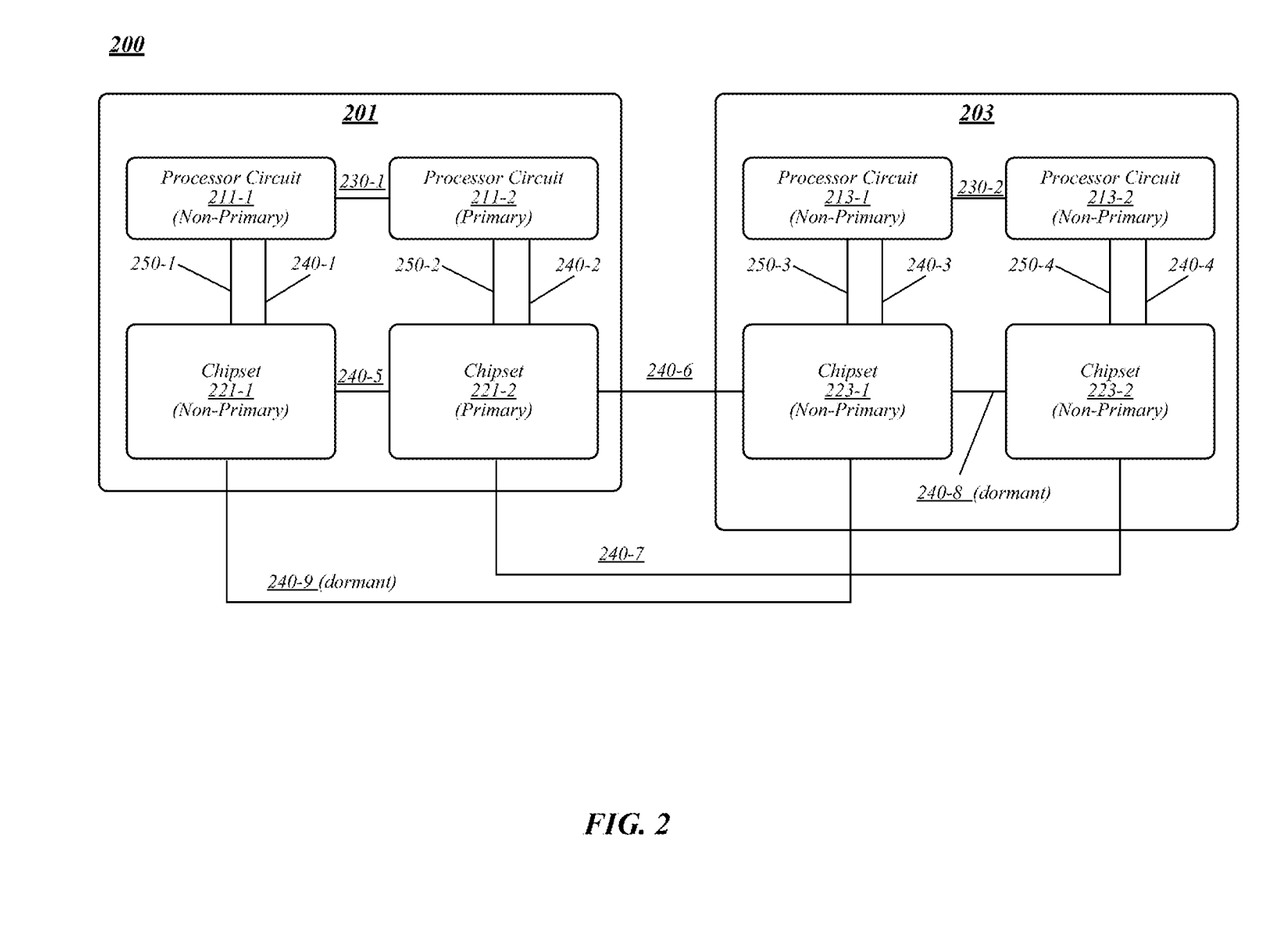
FIG. 2 illustrates a first embodiment of a data center.

With some embodiments, multiple systems including processor circuits 110 and chipsets 120 can be coupled together via SBIs 140 as detailed herein. For example, a data center comprising multiple systems (e.g., multiple systems 100, or the like) can be deployed and configurations of multiple ones of these systems dynamically arranged. FIG. 2 illustrates an example of a system 200 implemented in accordance with some embodiments of the present disclosure. It is noted, that system 200 could be part of a larger collection of systems, such as, might be implemented in a data center. The system 200 includes sub-systems 201 and 203, sometimes referred to as "boards" or simply "systems". Each of systems 201 and 203 comprise several processor circuits and chipsets. In general, the processor circuits and chipsets of systems 201 and 203 can be like the processor circuits and chipsets in system 100 of FIG. 1.

System 201 includes processor circuit 211-1 and processor circuit 211-2. Additionally, system 201 includes chipset 221-1 and chipset 221-2. Similarly, system 203 includes processor circuit 213-1 and processor circuit 213-2. Additionally, system 203 includes chipset 223-1 and chipset 223-2. It is noted that systems 201 and 203 need not include the same number of processor circuits as chipsets. For example, a single chipset could be arranged to couple to multiple processor circuits (e.g., as in FIG. 3-4). Additionally, although processor circuits 211 and 213 are depicted separately from respective chipsets 221 and 223, examples could include a system where chipsets 221 and 223 are integrated into respective processor circuits 211 and 213. Furthermore, system 201 need not include the same number of chipsets or processor circuits as system 203. Lastly, systems 201 and 203 could include other components, such as, for example, memory, network interfaces, radios, a power source and/or battery, display components, graphics processing circuitry, peripheral components, or the like. Additionally, in some examples, processor circuits 211 and 213 can be cores of a multi-core processor. Examples are not limited in these contexts.

In general, processor circuits 211 and 213 can be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuits 211 and 213 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuits 211 and 213 may be implemented as a general-purpose processor. The embodiments are not limited in this context.

In general, chipsets 221 and 223 can comprise hardware logic and circuitry arranged to manage data flow between respective processor circuits 211 and 213 and memory and/or peripherals coupled to the systems 201 and/or 203. For example, chipsets 221 and 223 could be a northbridge chipset, a southbridge chipsets, a platform control hub (PCH), a Fusion Control Hub (FCH), a custom designed chipset, or the like. It is noted, that an exhaustive list of all possible chipsets is not practical to list here. However, as used herein, "chipset" is intended to mean a hardware circuit arranged to couple a processor circuit to memory, peripherals, or interfaces.

Each of processor circuits 211 and 213 can be coupled to one or more other ones of processor circuits 211 and/or 213 via a point-to-point (P2P) interconnect 230. For example, processor circuit 211-1 is depicted coupled to processor circuit 211-2 via P2P interconnect 230-1 while processor circuit 213-1 is depicted coupled to processor circuit 213-2 via P2P interconnect 230-2. In general, P2P interconnects 230 can be any of a variety of interconnects arranged to couple processor components to each other. For example, P2P interconnects 230 can be a front-side bus, a Hyper Transport link, a QuickPath Interconnect, an UltraPath Interconnect, or the like. With some examples, the P2P interconnects 230 can couple processor circuits 211 and 213 to other components, such as, for example, cache, unicore components, or the like.

Each of chipsets 221 and 223 can be coupled to a respective processor circuit 211 and 213 via both a P2P interconnect 250 as well as a side band interconnect (SBI) 240. For example, chipset 221-1 is depicted coupled to processor circuit 211-1 via P2P interconnect 250-1 and SBI 240-1; chipset 221-2 is depicted coupled to processor circuit 211-2 via P2P interconnect 250-2 and SBI 240-2; chipset 223-1 is depicted coupled to processor circuit 213-1 via P2P interconnect 250-3 and SBI 240-3; and chipset 223-2 is depicted coupled to processor circuit 213-2 via P2P interconnect 250-4 and SBI 240-4. In general, P2P interconnects 250 can be any of a variety of interconnects arranged to couple processor components to each other. For example, P2P interconnects 150 can be a front-side bus, a Hyper Transport link, a QuickPath Interconnect, an UltraPath Interconnect, or the like.

Additionally, ones of chipsets 221 and/or 223 can be coupled to other ones of the chipsets 221 and/or 223 via SBIs 240. For example, chipset 221-2 is depicted coupled to chipset 221-1, chipset 223-1 and chipset 223-2 via SBI 240-5, SBI 240-6, and SBI 240-7, respectively. Likewise, chipset 223-1 is depicted coupled to chipsets 221-1, chipset 221-2 and chipset 223-2 via SBI 240-9, SBI 240-6, and SBI 240-8, respectively.

During operation, one of the processor circuits 211 and 213 as well as one of the chipsets 221 and 223 identify as a "primary" processor circuit and a "primary" chipset while the other processor circuits and chipsets identify as "non-primary" processor circuits and "non-primary" chipsets. For example, chipset 221-2 and processor circuit 211-2 identifies as a "primary" while the other chipsets 221-1, 223-1 and 223-2 and processor circuits 211-1, 213-1 and 213-2 identify as "non-primary."

The primary chipset (e.g., 221-2) can be arranged to couple to the other non-primary chipsets (e.g., 221-2, 223-1 and 223-2) via SBIs 240. Additionally, each of chipsets 221 and 223 can be arranged to couple to one or more processor circuits 211 and/or 223 via SBIs 240. Thus, system 200 can be implemented to provide an increase in coordination, due to the SBI 240 connections between elements within system 200. For example, in some embodiments, system 200 can be arranged to add a non-primary chipset (e.g., chipsets 223-1 and 223-2) or processor circuits (e.g., processor circuits 213-1 and 213-2) to system 200 while system 200 is in operation. Specifically, system 203 could be coupled to system 201 without rebooting system 201 based on coupling chipsets 223 to primary chipset 221-2 via SBIs 240. It is noted, that this is not possible using conventional techniques to couple chipsets within processor circuits.

In general, chipsets 221 and 223 are arranged to receive a control signal to include an indication of whether the chipset is a primary chipset or a non-primary chipset. Additionally, chipsets 221 and 223 are arranged to receive a control signal to include an indication of whether the chipsets 221 and 223 are in a multi-chipset system (e.g., system 200, or the like). For example, in some implementations, each of chipsets 221 and 223 can include pin straps arranged to receive control signals including indications of whether the chipsets 221 and 223 are a primary or a non-primary chipset, as well as whether the chipsets are in a multi-chipset system.

Furthermore, chipsets 221 and 223 can be arranged to determine whether an SBI 240 is active or inactive. For example, chipsets 221 and 223 can be arranged to determine whether an SBI 240 is coupled to another chipset 221 and/or 223 or a processing circuit 211 or 213 that is active within system 200. As another example, chipsets 221 and 223 can be arranged to determine whether one or multiple SBIs 240 is active. For example, all but one chipset in system 200 are non-primary chipsets. In some embodiments, a non-primary chipset can only be connected to a primary chipset and processor circuit(s) via SBIs 240. As such, any SBIs 240 that couple a non-primary chipset to another non-primary chipset (e.g., SBI 240-8 and 240-9, or the like), can be designated as inactive or dormant. This is described in greater detail below, for example, when discussing FIG. 5.

Figure 3:
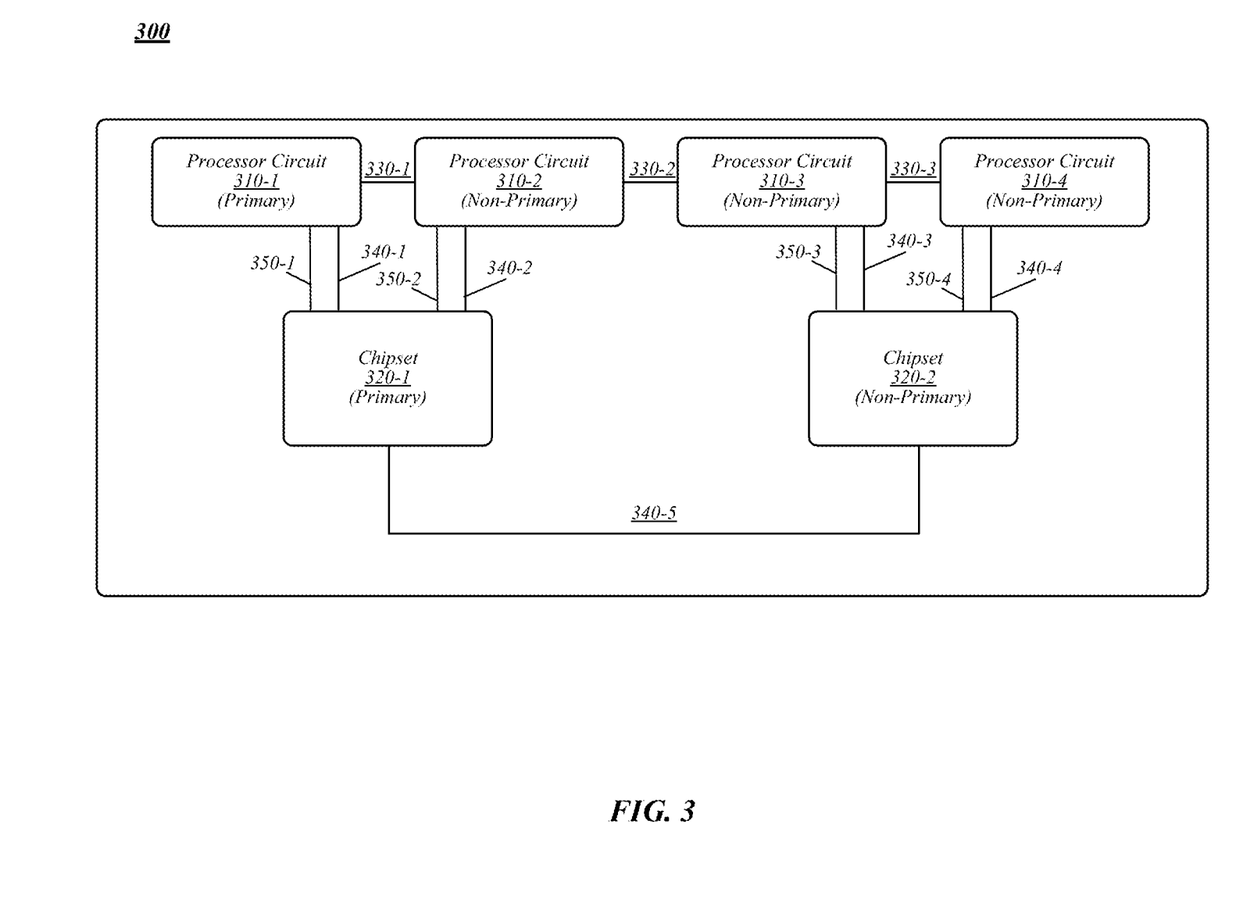
FIG. 3 illustrates a second embodiment of a system.
Figure 4:
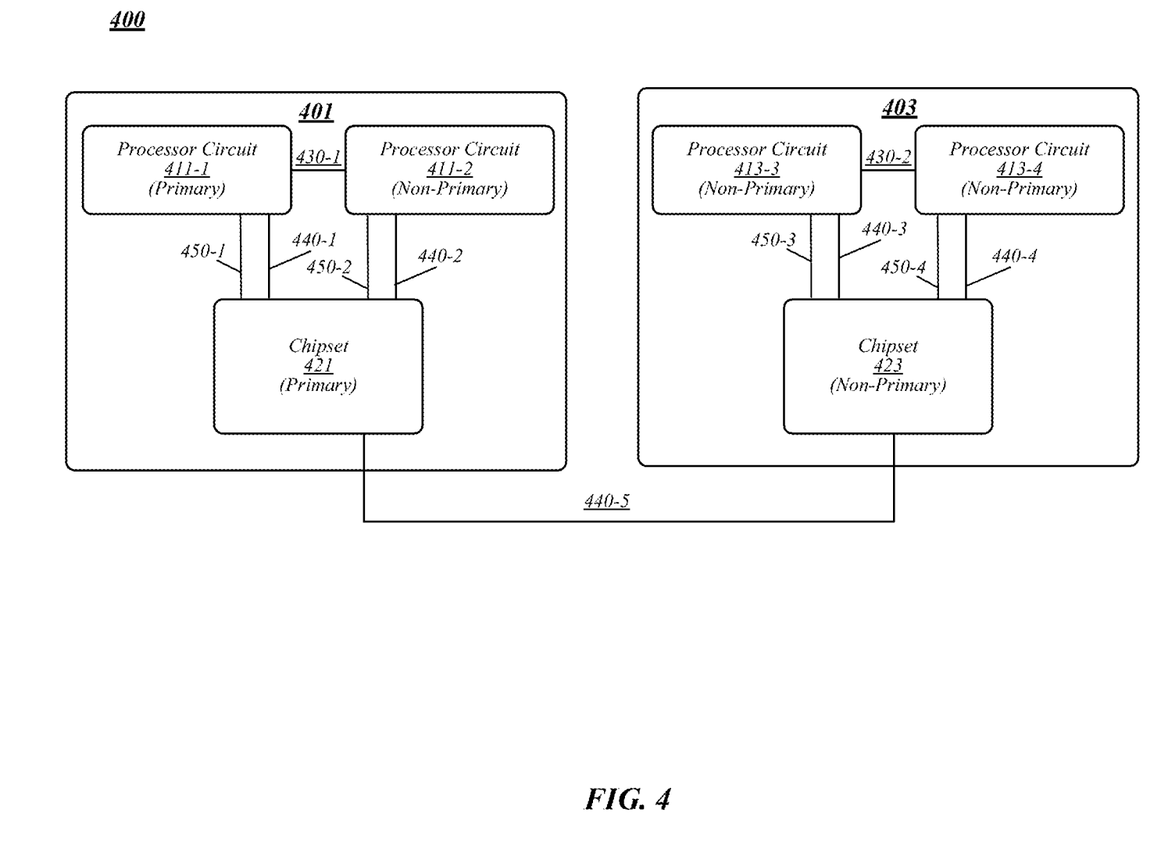
FIG. 4 illustrates a second embodiment of a data center.

In some embodiments, a chipset could be arranged to couple to multiple processor circuits. For example, FIG. 3-4 depict a system 300 and system 400, respectively, where a chipset couples to multipole processor circuits. It is noted, that the system 300 and system 400 of these figures operate similarly to the system 100 and system 200 of FIGS. 1-2. As such, operation of the system 300 and system 400 is not described below but, instead, the description of the operation of system 100 and system 200 is referenced. Furthermore, system 300 and system 400 can be implemented to coordinate coupling of components and/or adding components to a system as detailed herein, for example, as described in FIGS. 5-6. Examples are not limited in this context. Turning more specifically, to FIG. 3, system 300 is depicted. The example system 300 comprises processor circuit 310-1, processor circuit 310-2, processor circuit 310-3, and processor circuit 310-4. Additionally, system 300 includes chipset 320-1 and chipset 320-2. In general, processor circuits 310-1 to 310-4 can be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuits 310-1 to 310-4 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuits 310-1 to 310-4 may be implemented as a general-purpose processor. The embodiments are not limited in this context.

In general, chipsets 320-1 to 320-2 can comprise hardware logic and circuitry arranged to manage data flow between respective processor circuits 310-1 to 310-4 and memory and/or peripherals coupled to the system 300. For example, chipset 320-1 to 320-2 could be a northbridge chipset, a southbridge chipsets, a platform control hub (PCH), a Fusion Control Hub (FCH), a custom designed chipset, or the like. It is noted, that an exhaustive list of all possible chipsets is not practical to list here. However, as used herein, "chipset" is intended to mean a hardware circuit arranged to couple a processor circuit to memory, peripherals, or interfaces.

Each of processor circuits 310-1 to 310-4 can be coupled to one or more other ones of processor circuits 310-1 to 310-4 via a point-to-point (P2P) interconnect 130. For example, processor circuit 310-1 is depicted coupled to processor circuit 310-2 via P2P interconnect 330-1 while processor circuit 310-2 is also depicted coupled to processor circuit 310-3 via P2P interconnect 330-2. Additionally, processor circuit 310-3 is depicted coupled to processor circuit 310-4 via P2P interconnect 330-3. In general, P2P interconnects 330 can be any of a variety of interconnects arranged to couple processor components to each other. For example, P2P interconnects 330 can be a front-side bus, a Hyper Transport link, a QuickPath Interconnect, an UltraPath Interconnect, or the like. With some examples, the P2P interconnects 330 can couple processor circuits 310-1 to 310-4 to other components, such as, for example, cache, unicore components, or the like.

Each of chipsets 320-1 and 320-2 can be coupled to several processor circuit 310 via both a P2P interconnect 350 as well as a side band interconnect (SBI) 340. For example, chipset 320-1 is depicted coupled to processor circuits 310-1 and 310-2 via P2P interconnects 350-1 and 350-2 as well as SBI 340-1 and 340-2, respectively while chipset 320-2 is depicted coupled to processor circuits 310-3 and 310-4 via P2P interconnects 350-3 and 350-4 as well as SBI 340-3 and 340-4, respectively. Additionally, chipsets 320-1 and 320-2 can be coupled to each other, for example, via SBI 340-5. In general, P2P interconnects 350 can be any of a variety of interconnects arranged to couple processor components to each other. For example, P2P interconnects 150 can be a front-side bus, a Hyper Transport link, a QuickPath Interconnect, an UltraPath Interconnect, or the like.

During operation, one of the processor circuits 310 and one of the chipsets 320 identify as a "primary" processor circuit and a "primary" chipset while the other processor circuits and chipsets identify as "non-primary" processor circuits and "non-primary" chipsets.

The primary chipset 320-1 can be arranged to couple to other non-primary chipsets via SBIs. Thus, system 300 can be implemented to provide an increase in coordination, due to the SBI 340 connections between elements within system 300 (or in a larger data center in which system 100 might be deployed).

Turning more particularly to FIG. 4, system 400 is depicted. It is noted, that system 400 could be part of a larger collection of systems, such as, might be implemented in a data center. The system 400 includes sub-systems 401 and 403, sometimes referred to as "boards" or simply "systems". Each of systems 401 and 402 includes a chipset and multiple processor circuits. System 401 includes processor circuit 411-1 and processor circuit 411-2. Additionally, system 201 includes chipset 421. Similarly, system 403 includes processor circuit 413-1 and processor circuit 413-2. Additionally, system 403 includes chipset 423-1 and chipset 423-2. In general, processor circuits 411 and 413 can be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuits 411 and 413 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuits 411 and 413 may be implemented as a general-purpose processor. The embodiments are not limited in this context.

In general, chipsets 421 and 423 can comprise hardware logic and circuitry arranged to manage data flow between respective processor circuits 411 and 413 and memory and/or peripherals coupled to the systems 401 and/or 403. For example, chipsets 421 and 423 could be a northbridge chipset, a southbridge chipsets, a platform control hub (PCH), a Fusion Control Hub (FCH), a custom designed chipset, or the like. It is noted, that an exhaustive list of all possible chipsets is not practical to list here. However, as used herein, "chipset" is intended to mean a hardware circuit arranged to couple a processor circuit to memory, peripherals, or interfaces.

Each of processor circuits 411 and 413 13 can be coupled to one or more other ones of processor circuits 411 and/or 413 via a point-to-point (P2P) interconnect 430. For example, processor circuit 411-1 is depicted coupled to processor circuit 411-2 via P2P interconnect 430-1 while processor circuit 413-1 is depicted coupled to processor circuit 413-2 via P2P interconnect 430-2. In general, P2P interconnects 430 can be any of a variety of interconnects arranged to couple processor components to each other. For example, P2P interconnects 430 can be a front-side bus, a Hyper Transport link, a QuickPath Interconnect, an Ultra-Path Interconnect, or the like. With some examples, the P2P interconnects 430 can couple processor circuits 411 and 413 to other components, such as, for example, cache, unicore components, or the like.

Each of chipsets 421 and 423 can be coupled to processor circuits 211 and 213, respectively, via both a P2P interconnect 450 as well as a side band interconnect (SBI) 440. For example, chipset 421 is depicted coupled to processor circuits 411-1 and 411-2 via P2P interconnects 450-1 and 450-2 as well as SBIs 440-1 and 440-2. Likewise, chipset 423 is depicted coupled to processor circuits 413-1 and 413-2 via P2P interconnects 450-3 and 450-4 as well as SBIs 440-3 and 440-4. Additionally, chipsets 421 and 423 can be coupled to each other via SBI 440-5.

During operation, one of the processor circuits 411 and 413 as well as one of the chipsets 421 and 423 identify as a "primary" processor circuit and a "primary" chipset while the other processor circuits and chipsets identify as "non-primary" processor circuits and "non-primary" chipsets. For example, chipset 421 and processor circuit 411-1 identifies as a "primary" while the other chipsets 423 and processor circuits 411-2, 413-1 and 413-2 identify as "non-primary."

Figure 5:
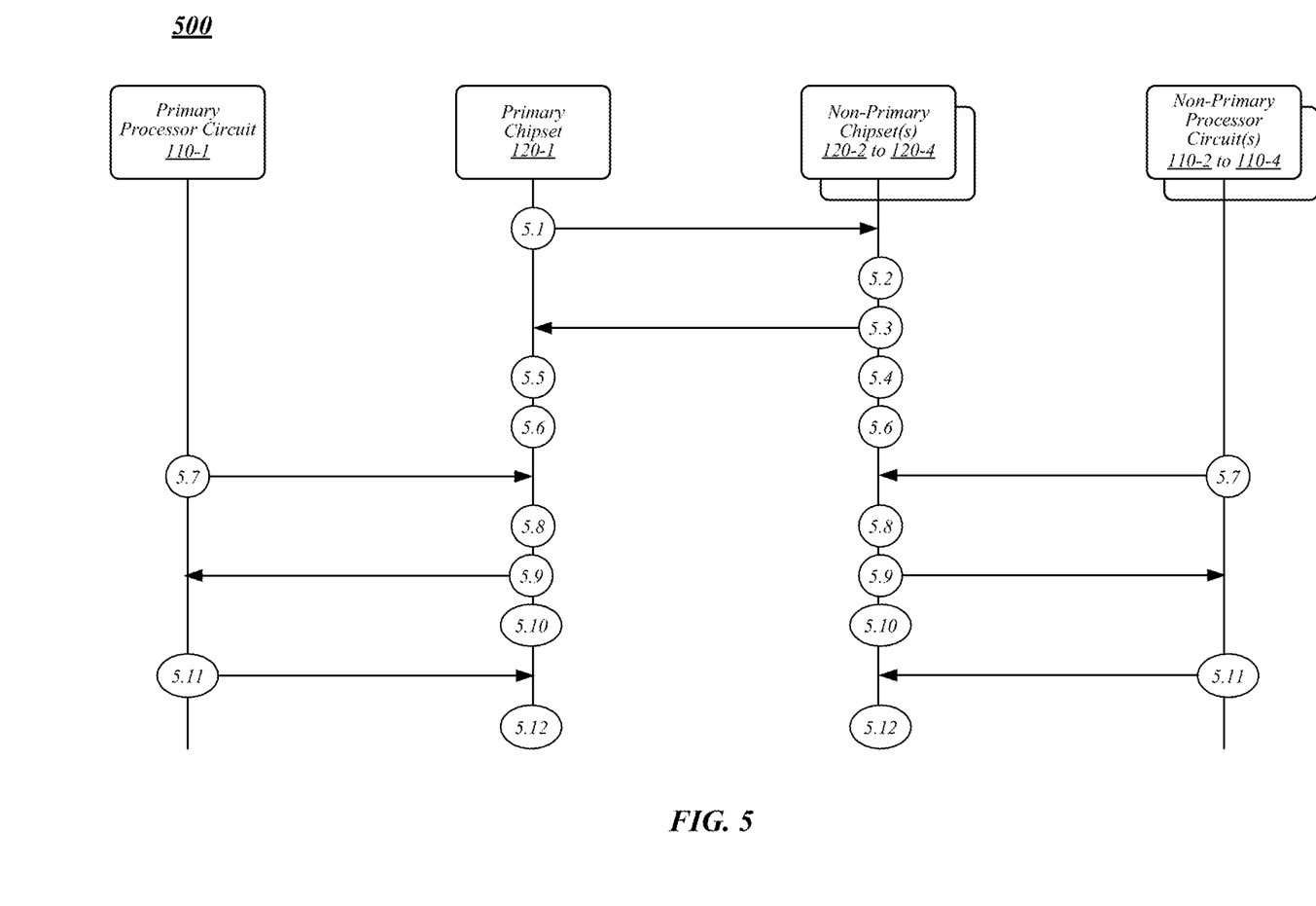
FIG. 5 illustrates a first embodiment of a logic flow.
Figure 6:
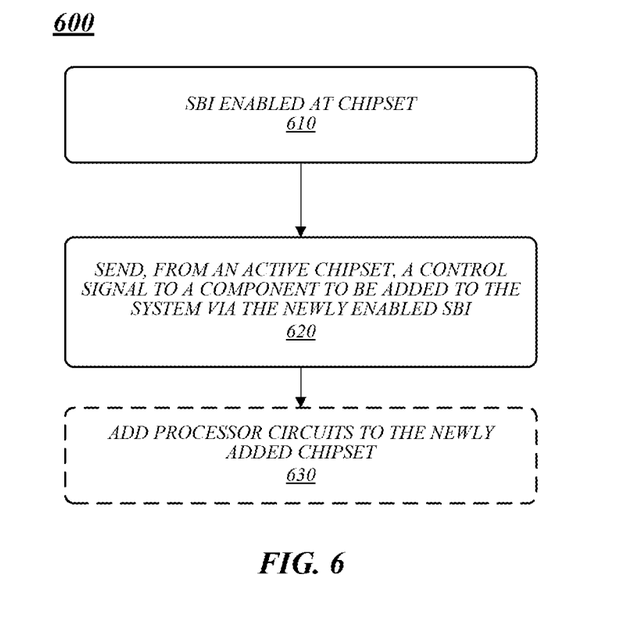
FIG. 6 illustrates a second embodiment of a logic flow.

FIG. 5-6 depict example logic flows 500 and 600, respectively, which may be representative of implementations of one or more techniques to discover components within a system and dynamically couple such components for coordinated flows within a system. These logic flows may be representative of operations that may be performed by a system, such as system 100 of FIG. 1, to coordinate among components within the system. For purposes of clarity, logic flows 500 and 600 are described with reference to system 100 of FIG. 1. However, examples of not limited in this context.

Turning more specifically, to FIG. 5, technique 500 can begin at circle 5.1. At circle 5.1, a primary chipset can send a control signal over several SBIs to indicate to non-primary chipsets that the primary chipset is "ready" or "active." For example, primary chipset 120-1 can send a control signal on SBIs 140-5, 140-6, and 140-7 including an indication to non-primary chipsets 120-2 to 120-4 that primary chipset 120-1 is active or ready.

Continuing to circles 5.2 and 5.3, non-primary chipsets can receive the control signals sent or asserted at circle 5.1 and can (1) designate the SBI over which the signal was received as active and (2) send an acknowledgment back over the SBI. For example, non-primary chipsets 120-2 to 120-4 can receive control signals asserted by primary chipset 120-1 at circle 5.1 via respective SBIs 140. Non-primary chipsets 120-2 to 120-4 can designate the SBIs as active and can respond with an acknowledgment over the SBI. As a specific example, non-primary chipset 120-2 can receive the control signal asserted by primary chipset 120-1 at circle 5.1 via SBI 140-5. Non-primary chipset 120-2 can designate SBI 140-5 as active at circle 5.2 and can send an acknowledgment to primary chipset 120-1 via SBI 140-5 at circle 5.3.

With some examples, each of the chipsets can be associated with a unique partition identification number or ("PID"). Thus, at circle 5.1, a primary chipset can send control signals to other chipsets including an indication of a PID. At circles 5.2 and 5.3, non-primary chipsets can be arranged to respond to control signals including an indication of the addressed chipsets PID. During operation, a non-primary chipset may receive control signals from multiple other chipsets at circle 5.1. For example, a system such as system 200 with multiple sub-systems 201 and 203 where the chipsets from each sub-system (e.g., chipsets 221-1, 221-2, 223-1, and 223-2) are fully connected; a chipset may receive multiple control signals at circle 5.1. More particularly, in situations where sub systems 201 and 202 are operated separately, each non-primary chipset may initially receive multiple control signals at circle 5.1. As such, the chipsets may be arranged to respond at circle 5.2 and 5.3 to control signals including an indication of the chipset's PID. Chipsets will not respond to control signal that do not include an indication of the chipset's PID. Chipsets asserting control signals that are not responded to can time out (e.g., as described below for circles 5.4 and 5.5) and the associated SBIs can be deactivated.

Continuing to circles 5.4 and 5.5, remaining chipset SBIs can be designated as inactive or dormant. Said differently, SBIs over which primary chipset control signals are not asserted or over which acknowledgments are not received can be designated as inactive. For example, at circle 5.4, non-primary chipsets can designate SBIs over which control signals are not asserted as dormant. As a specific example, non-primary chipset 223-1 of FIG. 2 could designate SBIs 240-8 and 240-9 as dormant at circle 5.4. At circle 5.5, primary chipset 120-1 may designate SBIs over which an acknowledgment is not received as dormant. For example, at circle 5.5, primary chipset 120-1 may determine that an acknowledgment is not received over an SBI in a defined amount of time and designate that SBI as dormant.

Continuing to circles 5.6, chipsets can wait for control signals from processing circuits indicating the processing circuits are ready. For example, at circles 5.6, primary chipset 120-1 as well as non-primary chipsets 120-2 to 120-4 can wait for a control signal from a processing circuit (e.g., primary processing circuit 110-1, non-primary processing circuits 110-2 to 110-4, or the like) indicating the processing circuit is ready. Continuing to circles 5.7 chipsets can receive, via an SBI, a control signal from a processing unit indicating the processing unit is active. For example, primary chipset 120-1 can revive a control signal from processing unit 110-1 via SBI 140-1 indicating the processing unit 110-1 is ready or active. As another example, ones of non-primary chipsets 120-2 to 120-4 can receive control signals from ones of processor circuits 120-2 to 120-4 indicating processor circuits 120-2 to 120-4 are ready or active.

Continuing to circles 5.8 and 5.9, chipsets can receive the control signals sent or asserted at circle 5.7 and can (1) designate the SBI over which the signal was received as active and (2) send an acknowledgment back over the SBI. For example, primary chipset 120-1 can receive the control signal asserted by primary processing circuit 110-1 via SBI 140-1 at circle 5.7 and can designate SBI 140-1 as active at circle 5.8. At circle 5.9, primary chipset 120-1 can send an acknowledgment to processing circuit 110-1 via SBI 140-1 indicating that the chipset has designated the SBI as active. Likewise, each of chipsets 120-2 to 120-4 can receive control signals asserted by processing circuits at circle 5.7 via respective SBIs 140. Non-primary chipsets 120-2 to 120-4 can designate the SBIs as active and can respond with an acknowledgment over the SBI.

Continuing to circle 5.10, remaining processing unit SBIs can be designated as inactive or dormant. Said differently, SBIs over which processing unit control signals are not asserted or over which acknowledgments are not received can be designated as inactive. For example, as depicted above, a chipset could be coupled to multiple processing circuits via multiple "chipset to processing circuit" SBIs. As such, at circle 5.10 any chipset to processing unit SBIs where control signals are not asserted by a processing circuit can be designated as dormant. In some examples, where control signals are not asserted on SBIs within a threshold (or specified amount of time) the processing unit can be designated as dormant, Continuing to circles 5.11 and 5.12, processing circuits can communicate characteristics to chipsets and chipsets can capture such characteristics. For example, at circle 5.11, processing circuits can send characteristics, such as, socket identification information, primary or non-primary designations, etc. As a specific example, at circle 5.11 primary processing circuit 110-1 can send indications of a socket identification and an indication that the processing circuit 110-1 is a primary processing circuit at primary chipset 120-1. At circles, 5.12, chipsets can capture and/or record the received characteristics.

Turning to FIG. 6 and logic flow 600. Logic flow 600 can begin at block 610. At block 610, "SBI enabled at chipset" an SBI is enabled at a chipset. In some implementations, a basic-input-output-system (BIOS) can enable the SBI. For example, with some embodiments, a BIOS can set or program a register or strap in a chipset to enable an SBI. With some embodiments, the BIOS can enable an SBI for a currently active chipset. For example, an SBI which was designated as dormant (e.g., refer to FIG. 5) previously can be set to active to bring additional components of a system online with the newly activated SBI. As a specific example, a chipset to chipset SBI (e.g., SBI 140-5, or the like) could be activated to bring a chipset partition (e.g. chipset 120-2 and attached processing circuit 110-2, or the like) online in a system (e.g., system 100, or the like). As another example, a chipset to processor SBI (e.g., SBI 340-2, or the like) could be activated to bring another processing circuit (e.g., processor circuit 310-2, or the like) online in a system (e.g., system 300, or the like). It is important to note, that the component being "onlined" or activated can undergo a reset. However, the rest of the system can remain operational and not be reset, which is different than conventional systems.

Continuing to block 620 "send, from an active chipset, a control signal to a component to be added to the system via the newly enabled SBI" a control signal can be sent to a component to be added to the system via the newly enabled SBI. For example, when adding a processing circuit to a system, the chipset can send a control signal to the processing circuit via the newly enabled SBI to include an indication for the processing circuit to undergo a reset. The chipset can then wait for a control signal from the processing circuit (e.g., like at circle 5.6 of FIG. 5). As another example, when adding a chipset partition to a system, the chipset can send a control signal to the chipset to be added via the newly activated SBI (e.g., like at circle 5.1 of FIG. 5). With some embodiments, the chipset can send a control signal to another chipset including an indication that the chipset is being added to an active or currently running system.

Logic flow 600 can further include block 630. It is noted, that block 630 can be included in logic flow 600 where logic flow 600 is adding a chipset portion to an active system. For example, at block 620, an active chipset can send a control signal to another chipset to add the chipset to the system. At block 630 "add processing circuits to the newly added chipset" the newly added chipset can send control signals to any processor circuits coupled to the chipset to cause the processor circuits to reset and initiate coupling and/or coordination with the newly added chipset.

Figure 7:
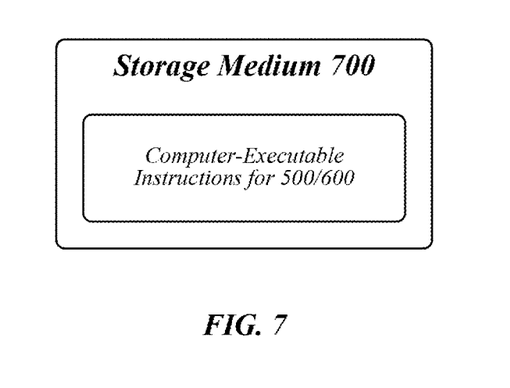
FIG. 7 illustrates an embodiment of a storage medium.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement logic flow 500 of FIG. 5. In some embodiments, storage medium 700 may store computer-executable instructions, such as computer-executable instructions to implement logic flow 600 of FIG. 6. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
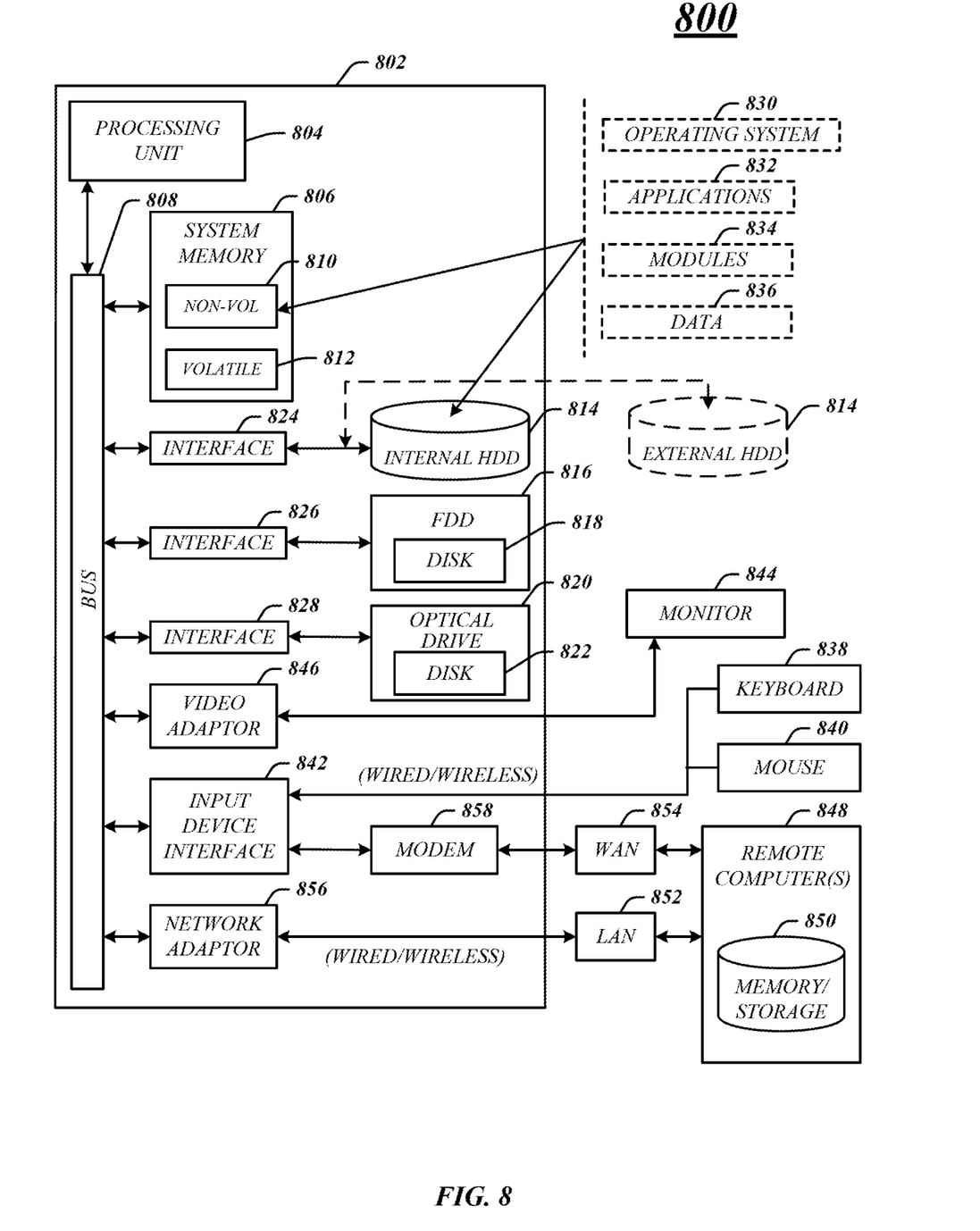
FIG. 8 illustrates an embodiment of a computing architecture.

FIG. 8 illustrates an embodiment of an exemplary computing architecture 800 suitable for implementing various embodiments as previously described. In various embodiments, the computing architecture 800 may comprise or be implemented as part of an electronic device. In some embodiments, the computing architecture 800 may be representative, for example, of system 100 of FIG. 1. The embodiments are not limited in this context. It is important to note, that although the architecture 800 depicted in this figure is depicted as a standalone device (e.g., desktop server) the components can be configured and/or arranged from disaggregate computing components, such as, can be found in a data center. Examples are not limited in this context.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of apparatus 200.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
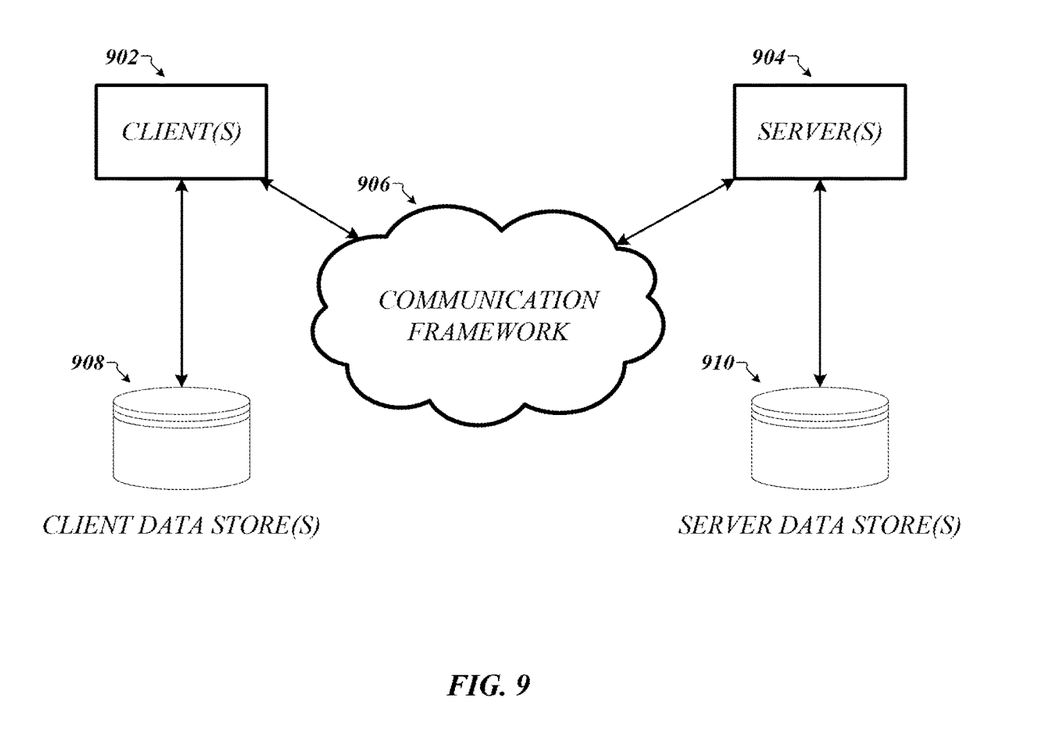
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 and the servers 904 are operatively connected to one or more respective client data stores 908 and server data stores 910 that can be employed to store information local to the respective clients 902 and servers 904, such as cookies and/or associated contextual information. Any one of clients 902 and/or servers 904 may implement one or more of apparatus 100, 200, 300 or 400 of FIGS. 1-4 or techniques 500 or 600 of FIGS. 5-6, storage medium 700 of FIG. 7, or computing architecture 800 of FIG. 8.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD- RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The invention claimed is:

1. A system, comprising:
a plurality of processor circuits;
a first chipset coupled to a first one of the plurality of processor circuits via a first side-band-interconnect (SBI) and a first peer-to-peer (P2P) interconnect; and
a second chipset coupled to a second one of the plurality of processor circuits via a second SBI and a second P2P interconnect, the second chipset coupled to the first chipset via a third SBI, the second chipset comprising circuitry arranged to:
send a control signal to the first chipset via the third SBI to include an indication the second chipset is a primary chipset;
receive an acknowledgment from the first chipset via the third SBI; and
designate the third SBI as active in response to receiving the acknowledgment.

2. The system of claim 1, comprising a third chipset coupled to a third one of the plurality of processor circuits via a fourth SBI and a third P2P interconnect, the third chipset coupled to the second chipset via a fifth SBI, the second chipset comprising circuitry arranged to:
send a control signal to the third chipset via the fifth SBI to include an indication the second chipset is a primary chipset;
determine whether a timeout period has elapsed since sending the control signal via the fifth SBI; and
designating the fifth SBI as inactive based on a determination that the timeout period has elapsed since sending the control signal via the fifth SBI.

3. The system of claim 2, the second chipset comprising circuitry arranged to:
receive an acknowledgement from the third chipset via the fifth SBI; and
designate the fifth SBI as active in response to receiving the acknowledgment and based on a determination that the timeout period has not elapsed since sending the control signal via the fifth SBI.

4. The system of claim 2, the second chipset comprising circuitry arranged to:
receive a control signal to include an indication the fifth SBI is to be reactivated; and
send a control signal to the third chipset via the fifth SBI to include an indication the second chipset is a primary chipset.

5. The system of claim 4, comprising receiving the control signal to include an indication the fifth SBI is to be reactivated comprising programming a register at the second chipset.

6. The system of claim 1, the second chipset comprising circuitry arranged to:
wait for a control signal from the second processor circuit via the second SBI to include an indication the second processor circuit is ready;
send an acknowledgment to the second processor circuit via the second SBI; and
designate the second SBI as active.

7. The system of claim 6, the second chipset comprising circuitry arranged to receive, from the second processor circuit via the second SBI, an indication of a socket identification (ID) for the second processor circuit.

8. The system of claim 7, the second chipset comprising circuitry arranged to receive, from the second processor circuit via the second SBI, an indication the second processor circuit is a primary processor circuit.

9. The system of claim 6, the second chipset coupled to a third one of the plurality of processor circuits via a fourth SBI and a third P2P interconnect, the second chipset comprising circuitry arranged to:
wait for a control signal from the third processor circuit via the fourth SBI to include an indication the third processor circuit is ready;
determine whether a timeout period has elapsed since beginning to wait for the control signal from the third processor circuit via the fourth SBI; and
designate the fourth SBI as inactive based on a determination that the timeout period has elapsed since beginning to wait for the control signal from the third processor circuit via the fourth SBI.

10. The system of claim 9, the second chipset comprising circuitry arranged to:
change the designation of the fourth SBI from inactive to active;
send a reset signal to the third processor circuit via the fourth SBI; and
wait for a control signal from the processor processing circuit via the fourth SBI to include an indication the third processor circuit is ready.

11. The system of claim 1, the plurality of processor circuits comprising central processing circuits (CPUs) and the first and second chipsets comprising platform control hubs.

12. A method comprising:
sending, from a first chipset via a first side-band-interconnect (SBI) coupling the first chipset to a second chipset, a control signal to include an indication the first chipset is a primary chipset;
receiving an acknowledgment from the second chipset via the first SBI; and
designating the first SBI as active in response to receiving the acknowledgment.

13. The method of claim 12, comprising a third chipset coupled to one of a plurality of processor circuits via a second SBI and a peer-to-peer (P2P) interconnect, the third chipset coupled to the second chipset via a third SBI, the second chipset comprising circuitry arranged to:
sending, from the first chipset via the second SBI to the third chipset, a control signal to include an indication the first chipset is a primary chipset;
determining whether a timeout period has elapsed since sending the control signal via the second SBI; and
designating the second SBI as inactive based on a determination that the timeout period has elapsed since sending the control signal via the second SBI.

14. The method of claim 13, comprising:
receiving an acknowledgement from the third chipset via the second SBI; and
designating the second SBI as active in response to receiving the acknowledgment and based on a determination that the timeout period has not elapsed since sending the control signal via the second SBI.

15. The method of claim 13, comprising:
receiving a control signal to include an indication the second SBI is to be reactivated; and sending a control signal to the third chipset via the second SBI to include an indication the second chipset is a primary chipset.

16. The method of claim 15, comprising receiving the control signal to include an indication the second SBI is to be reactivated comprising programming a register at the second chipset.

17. The method of claim 12, comprising:
waiting for a control signal from a first processor circuit via a second SBI to include an indication the first processor circuit is ready, the first processor circuit coupled to the first chipset via the second SBI and a first peer-to-peer (P2P) interconnect;
sending an acknowledgment to the first processor circuit via the second SBI; and
designating the second SBI as active.

18. The method of claim 17, comprising receiving, from the first processor circuit via the second SBI, an indication of a socket identification (ID) for the first processor circuit.

19. The method of claim 18, comprising receiving, from the first processor circuit via the second SBI, an indication the first processor circuit is a primary processor circuit.

20. The method of claim 17, the first chipset coupled to first processor circuit of a plurality of processor circuits via a third SBI and a second P2P interconnect, the second chipset comprising circuitry arranged to:
waiting for a control signal from a second processor circuit of the plurality of processor circuits via a fourth SBI to include an indication the second processor circuit is ready, the second processor circuit coupled to the first chipset via the fourth SBI and a third P2P interconnect;
determining whether a timeout period has elapsed since beginning to wait for the control signal from the second processing circuit via the fourth SBI; and
designating the fourth SBI as inactive based on a determination that the timeout period has elapsed since beginning to wait for the control signal from the second processing circuit via the fourth SBI.

21. The method of claim 20, comprising:
changing the designation of the fourth SBI from inactive to active;
sending a reset signal to the second processor circuit via the fourth SBI; and
waiting for a control signal from the second processor circuit via the fourth SBI to include an indication the second processor circuit is ready.

22. An apparatus comprising:
a chipset comprising circuitry; and
a plurality of side-band-interconnects (SBI), each of the plurality of SBIs to couple the chipset to another chipset or a processor circuit, the circuitry to:
determine whether a first one of the plurality of SBIs couples the chipset to another chipset;
send a control signal via the first one of the plurality of SBIs to include an indication the chipset is a primary chipset based on a determination that the first one of the SBIs couples the chipset to another chipset;
receive an acknowledgment from the another chipset via the first one of the plurality of SBIs; and
designate the first one of the plurality of SBIs as active in response to receiving the acknowledgment.

23. The apparatus of claim 22, the circuitry to wait for a control signal from a first processor circuit via the first one of the plurality of SBIs to include an indication the first processor circuit is ready based on a determination that the first one of the SBIs does not couple the chipset to another chipset.

24. The apparatus of claim 23, the circuitry to:
receive the control signal from the first processor circuit via the first one of the plurality of SBIs;
send an acknowledgment to the first processor circuit via the first one of the plurality of SBIs; and
designate the first one of the plurality of SBIs as active.

25. The apparatus of claim 24, the circuitry to receive, from the first processor circuit via the first one of the plurality of SBIs, an indication of a socket identification (ID) for the first processing circuit.

\* \* \* \* \*